July 26, 1960

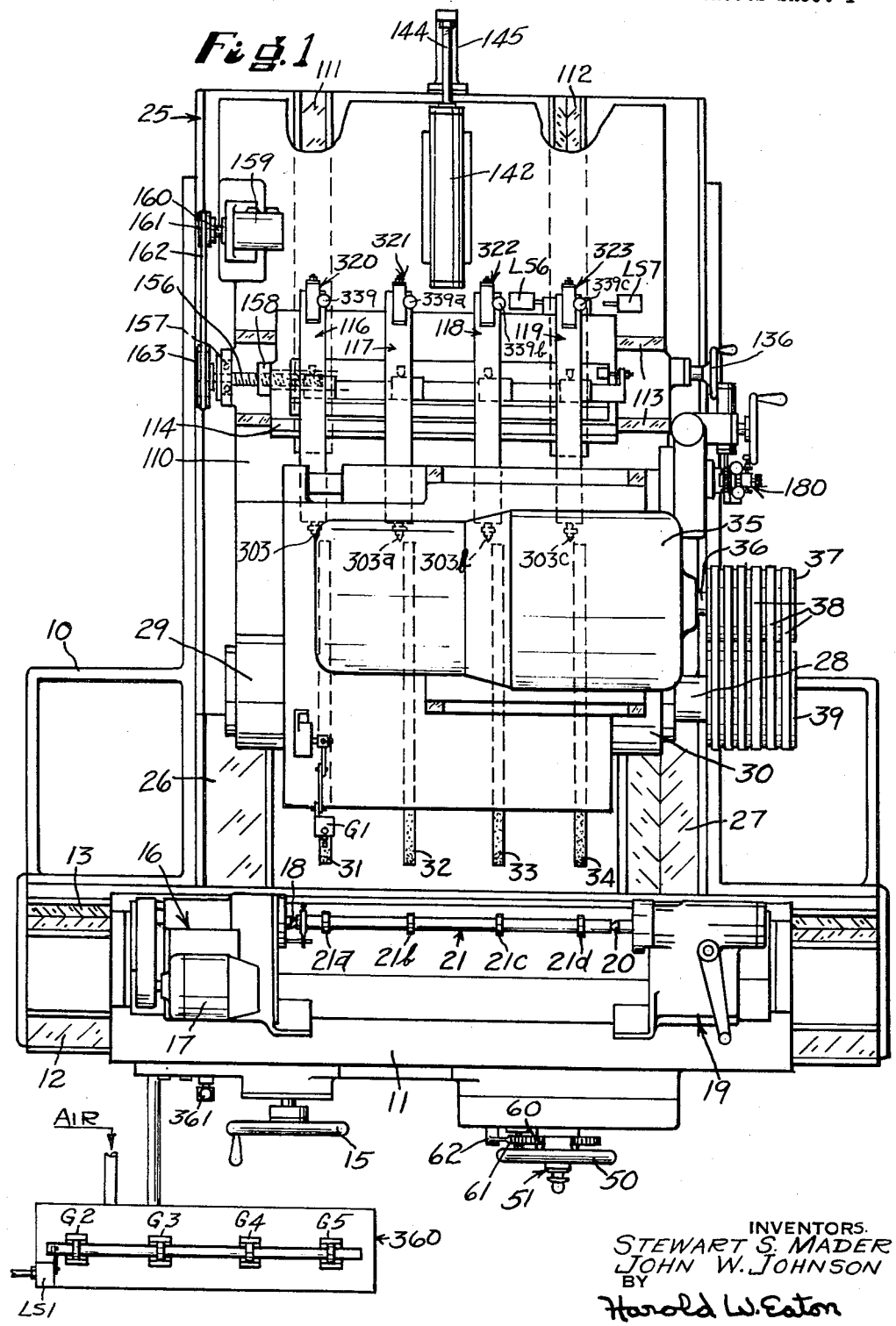

S. S. MADER ET AL 2,946,162

MULTIPLE WHEEL GRINDING MACHINE

Filed May 19, 1958

INVENTORS.
STEWART S. MADER
JOHN W. JOHNSON
BY
Harold W. Eaton
ATTORNEY

July 26, 1960
S. S. MADER ET AL
2,946,162
MULTIPLE WHEEL GRINDING MACHINE
Filed May 19, 1958
4 Sheets-Sheet 3
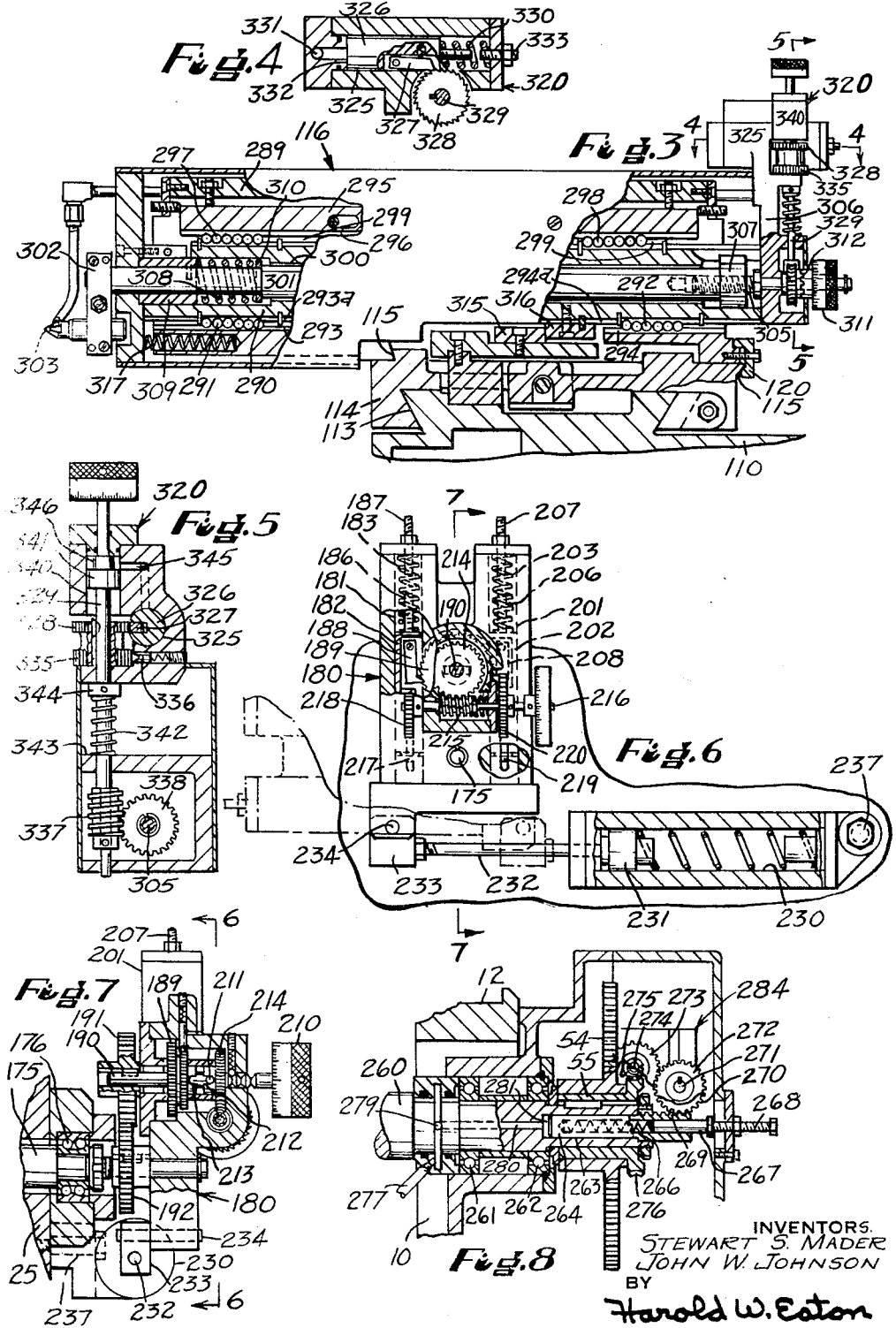
INVENTORS.
STEWART S. MADER
JOHN W. JOHNSON
BY
Harold W. Eaton
ATTORNEY

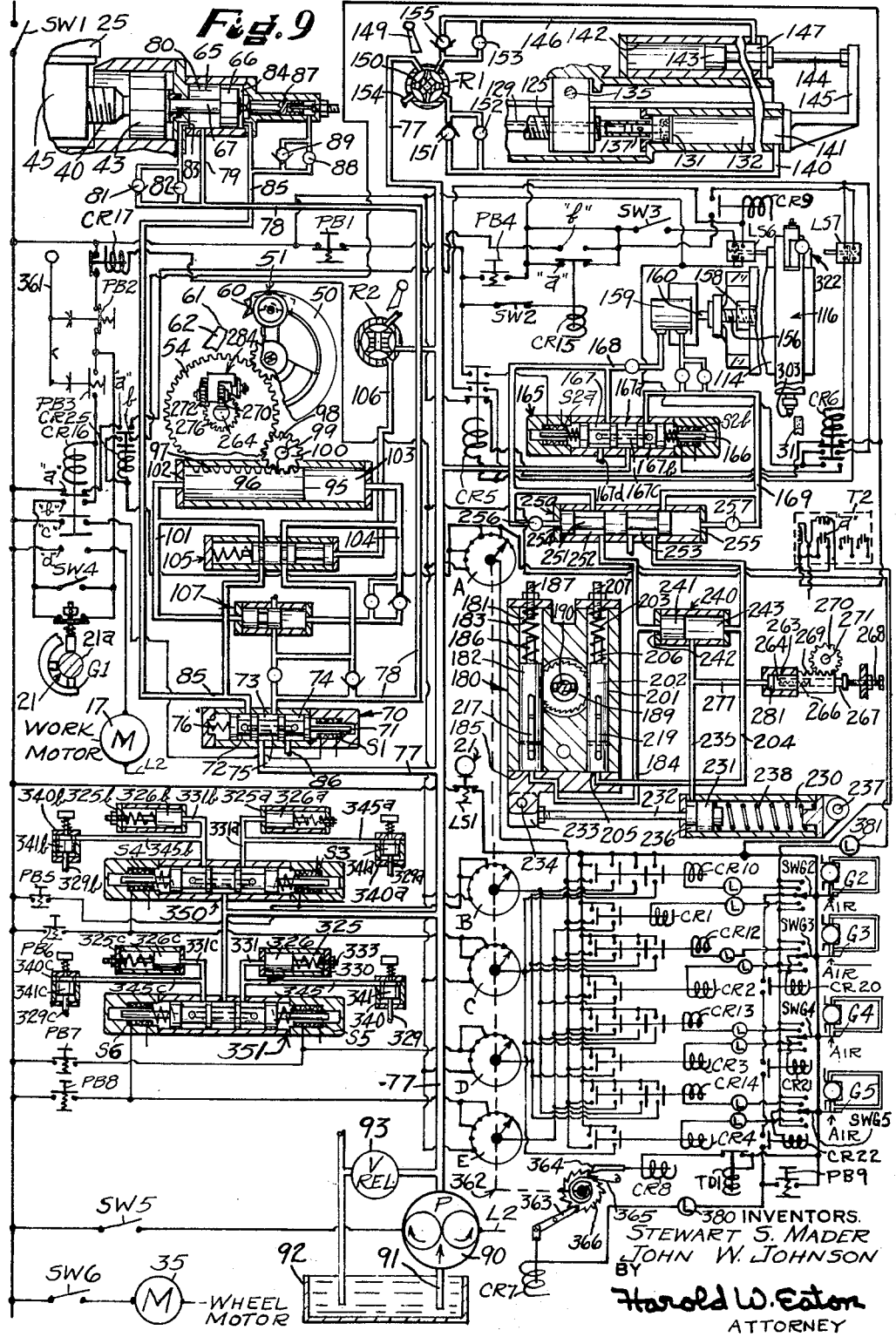

United States Patent Office 2,946,162
Patented July 26, 1960

2,946,162

MULTIPLE WHEEL GRINDING MACHINE

Stewart S. Mader, Worcester, and John W. Johnson, Holden, Mass., assignors to Norton Company, Worcester, Mass., a corporation of Massachusetts Filed May 19, 1958, Ser. No. 736,204

14 Claims. (Cl. 51—165)

The invention relates to grinding machines and more particularly to a multiple wheel cylindrical grinding machine.

One object of the invention is to provide a simple and thoroughly practical multiple wheel grinding machine having a memory control apparatus which is controlled by a post-process gauge automatically to control the grinding operation. Another object is to provide a multiple wheel grinding machine with an in-process work gauge for automatically terminating grinding cycle and a post-process gauge for automatically initiating a truing cycle when a predetermined number of work pieces are ground oversize or undersize but within tolerance limits. Another object is to provide a post-process gauge mechanism which is arranged to terminate the grinding cycle when work pieces are ground oversize or undersize and outside the tolerance limits.

Another object is to provide a memory control apparatus which is arranged to impart a compensating adjustment to one or more of the truing tools after a predetermined number of work pieces are ground off-size and to initiate a truing cycle. A further object is to provide an electric counter which is operatively connected to initiate a truing cycle after a predetermined number of work pieces have been ground to a predetermined size. Another object is to provide a memory control apparatus including a stepping switch which is controlled by the post-process gauge to either initiate a truing cycle after a predetermined number of work pieces are ground off-size, or to reset the stepping switch when a work piece is ground to a predetermined size and to reset the electric counter each time a truing cycle is initiated either by the electric counter or by the stepping switch. Other objects will be in part obvious or in part pointed out hereinafter.

One embodiment of the invention has been illustrated in the drawings in which:

Fig. 1 is a plan view of the improved multiple wheel grinding machine;

Fig. 2 is a vertical cross sectional view through the machine, showing the wheel feeding mechanism and the grinding wheel truing apparatus;

Fig. 3 is a fragmentary sectional view, on an enlarged scale, through one of the wheel truing units;

Fig. 4 is a fragmentary horizontal sectional view, on an enlarged scale, taken approximately on the line 4—4 of Fig. 3;

Fig. 5 is a fragmentary vertical sectional view, on an enlarged scale, taken approximately on the line 5—5 of Fig. 3;

Fig. 6 is a fragmentary vertical sectional view, taken approximately on the line 6—6 of Fig. 7;

Fig. 7 is a fragmentary vertical sectional view, taken approximately on the line 7—7 of Fig. 6;

Fig. 8 is a fragmentary vertical sectional view, through the compensating mechanism in the wheel feeding mechanism;

Fig. 9 is a combined electric and hydraulic diagram of the actuating mechanisms and the controls therefor; and Fig. 10 is a fragmentary diagrammatic illustration of one of the post-process gauges and the associated switch.

An improved multiple wheel grinding machine has been illustrated in the drawings comprising a base 10 which supports a longitudinally movable work table 11 on a slide way 12 and a V-way 13 formed on the upper surface of the base 10.

A manually operable traversing mechanism may be provided for imparting a longitudinal positioning movement to the table 11. This mechanism comprises a manually operable traverse wheel 15 which is rotatably supported on the front of the machine base and is operatively connected through a gear and rack mechanism (not shown) with the table 11. This mechanism is an old and well known mechanism in the grinding machine art and may be the same as that shown in the expired U.S. Patent No. 762,838 to C. H. Norton dated June 14, 1904, to which reference may be had for details of disclosure not contained herein.

The table 11 is provided with a rotatable work support comprising a motor driven headstock 16 which is provided with a driving motor 17. The headstock 16 is provided with a headstock center 18. The table 11 is also provided with a footstock 19 having a footstock center 20. The centers 18 and 20 serve as a rotatable support for the opposite ends of a work piece 21 having a plurality of spaced portions 21a, 21b, 21c, and 21d to be ground.

The base 10 also serves as a support for a transversely movable wheel slide 25 which is arranged to slide transversely relative to the base 10 on a slide-away 26 and a V-way 27 (Fig. 1). The wheel slide 25 is provided with a rotatable wheel spindle 28 which is journalled in suitable spaced bearings 29 and 30 carried by the slide 25. The wheel spindle 28 is provided with a plurality of spaced grinding wheels 31, 32, 33 and 34 which are supported simultaneously to grind the spaced portions 21a, 21b, 21c and 21d, respectively. The wheel spindle 28 and the grinding wheels are driven by an electric motor 35 which is mounted on the upper surface of the wheel slide 25. The motor 35 is provided with a motor shaft 36 which supports a multiple V-groove pulley 37. The pulley 37 is connected by multiple V-belts 38 with a multiple V-groove pulley 39 which is mounted on a right hand end of the wheel spindle 28 (Fig. 1).

A wheel feeding mechanism is provided for imparting a transverse movement to the wheel slide 25 comprising a rotatable feed screw 40 (Fig. 2), the left hand end of which is slidably keyed within a rotatable sleeve 41. The sleeve 41 is journalled in an anti-friction bearing 42 which is in turn supported by the base 10. The right hand end of the feed screw 40 (Fig. 2) is connected to a slidably mounted sleeve 43 which is supported within a cylindrical aperture 44 formed with the base 10. A feed nut 45 meshes with or engages the feed screw 40. The nut 45 is fixedly mounted on the underside of the wheel slide 25.

A manually operable mechanism is provided for imparting a rotary motion into the feed screw 40. This mechanism comprises a manually operable feed wheel 50 which is rotatably supported on the front of the machine base 10. The feed wheel 50 is provided with a micrometer adjusting mechanism 51 which is old and well known in the grinding machine art. The feed wheel 50 is operatively connected to impart a rotary motion to the gear 52. A gear 53 is mounted to rotate with the gear 52 and meshes with a gear 54 rotatably mounted on a sleeve 55 (Fig. 8). A gear 56 (Fig. 2) is mounted to rotate with the gear 54 and meshes an intermediate gear 57. The intermediate gear 57 meshes with a gear 58 mounted on the left hand end of a rotatable shaft 59. The right hand end of the shaft 59 is slidably keyed within the rotatable sleeve 41. The micrometer feed adjusting mechanism 51 is provided with a stop abutment 60 (Fig. 1) which is arranged to engage a stop surface 61 formed on the upper end of a pivotally mounted feed pawl 62 positively to limit the infeeding movement of the feed wheel 59 when it is moved in a counterclockwise direction to impart a rotary motion to the feed screw 40 to cause an infeeding movement of the grinding wheel slide 25.

A fluid pressure mechanism is provided for imparting a rapid approaching and proceeding movement to the wheel slide 25 rapidly positioning the grinding wheels 31, 32, 33, and 34 into an operative relationship with a work piece 21 to be ground. This mechanism comprises a cylinder 65 which contains a slidably mounted piston 66. The piston 66 is connected to the right hand end of a piston rod 67 (Figs. 2 and 9) the left hand end of the piston rods 67 is operatively connected to the slidably mounted sleeve 43. The cylinder 65 together with the piston 66 and the piston rods 67 are preferably arranged in axial alignment with the feed screw 40.

A feed control valve 70 (Fig. 9) is provided for controlling the admission to and exhaust of fluid from the cylinder 65. The valve 70 is a piston type valve having a slidably mounted valve member 71 which is provided with a plurality of spaced valve pistons forming a plurality of spaced valve chambers 72, 73, and 74. The slidably mounted valve member 71 is also provided with a central passage 75 which interconnects the valve chamber 72 with the valve chamber 74. A compression spring 76 is provided normally to hold the valve member 71 in a right hand end position, as illustrated in Fig. 9. A solenoid S1 is provided which when energized serves to shift the valve member 71 into a left hand end position.

When fluid under pressure is passed through a pipe 77 into the valve chamber 73, it passes through a pipe 78, through a port 79 into a cylinder chamber 80 formed at the left hand end of the cylinder 65. Fluid under pressure also passes through a ball check valve 81 and a throttle valve 82 and through a port 83 into a cylinder chamber 80 to cause the piston 66 to move toward the right (Figs. 2 and 9) to move the wheel slide 25 to a rearward or inoperative position. During this movement fluid within a cylinder chamber 84 passes through a pipe 85, through the valve chamber 72, through the central passage 75 into the valve chamber 74 and exhausts through the pipe 86. A dash-pot piston 87 is provided to facilitate cushioning the movement of the piston 66 toward the right so as to slow down the rapid movement of the piston 66 and the wheel slide 25 as it approaches a rearward or inoperative position. Fluid exhausting from the dash-pot cylinder passes through a throttle valve 88 into the pipe 85. By manipulation of the throttle valve 88, the rate of exhaust of fluid from the dash-pot cylinder may be varied as desired. A ball check valve 89 is provided between the pipe 85 and the dash-pot cylinder so that when the fluid is reversed, fluid under pressure may pass through the ball check valve 89 rapidly to fill the dash-pot cylinder for the next cushioning movement.

When it is desired to cause a rapid approaching movement of the wheel slide 25 and the grinding wheels 31, 32, 33, and 34, the solenoid S1 is energized to shift the valve member 71 toward hte left so that fluid under pressure entering the valve chamber 73 passes through the pipe 85 into the cylinder chamber 84 to cause a rapid movement of the piston 66 toward the left (Figs. 2 and 9). During the initial rapid movement of the piston 66 toward the right fluid within the cylinder chamber 80 exhausts through both the ports 79 and the port 83 and through the pipe 78 into the valve chamber 74 and through the exhaust pipe 86. As the piston 66 approaches the left hand end of its movement, the piston 66 closes the port 79 so that during the remainder of the movement of the piston 66 toward the left fluid within the cylinder chamber 80 must exhaust through the port 83 and the throttle valve 82 which serves to slow down the rapid approaching movement.

A fluid pressure system is provided for supplying a fluid under pressure to the operating mechanism of the machine. This system comprises a motor driven fluid pump 90 which may be started and stopped by actuation of a switch SW5. The pump 90 draws fluid under pressure through a pipe 91 from a reservoir 92 and passes fluid under pressure to the pressure pipe 77 to the normal mechanisms of the machine. A pressure relief valve 93 is provided in the pipe line 77 to facilitate by-passing excess fluid under pressure from the pressure pipe 77 directly to the reservoir 92 to facilitate maintaining substantially constant fluid pressure within the system.

A fluid pressure operated mechanism is provided for imparting a slow rotary motion to the feed screw 40 so as to control the infeeding movement of the grinding wheels so that they advance at a predetermined rate for the grinding operation. This mechanism comprises a cylinder 95 (Fig. 9) which contains a slidably mounted piston 96. The piston 96 is provided with rack teeth 97 on its upper surface which mesh with a gear 98 mounted on a rotatable shaft 99. The shaft 99 is provided with a gear 100 (Figs. 2 and 9) which meshes with the gear 54 so that when the piston 96 is moved axially within the cylinder 95, a rotary motion will be imparted to the feed screw 40 to cause an infeeding movement of the wheel slide 25 together with the grinding wheels 31, 32, 33, and 34. When it is desired to cause an infeeding movement, fluid under pressure is passed through a pipe 101 into a cylinder chamber 102 formed at the left hand end of the cylinder 95. During the infeeding movement, fluid within a cylinder chamber 103 exhausts through a pipe 104.

A by-pass valve 105 is provided which is arranged in the position shown in Fig. 9 to control the passage of fluid from the control valve 70 to the opposite ends of the cylinder 95. If it is desired to render the feed cylinder 95 inoperative to facilitate manual operation of the feeding mechanism, a rotary type valve R2 may be shifted in a counterclockwise direction to pass fluid under pressure from the pipe 77 through a pipe 106 to move the by-pass valve 105 into a left hand end position so that fluid within the cylinder chambers 102 and 103 may by-pass therethrough facilitating a manual actuation of the feed wheel 59. A backlash valve 107 is provided to facilitate rapidly taking-up backlash in the feed mechanism parts at the start of a feeding movement in either direction. This feeding mechanism is substantially identical with that disclosed in the U.S. Patent No. 2,522,485 to H. A. Silven and C. G. Flygare dated September 12, 1950 to which reference may be had for details of disclosure not contained herein.

A multiple wheel truing apparatus is provided whereby all of the grinding wheels 31, 32, 33, and 34 may be simultaneously trued. This mechanism comprises a cross slide 110 (Figs. 1 and 3) which is supported on a flat way 111 and a V-way 112 formed on the upper surface of the wheel slide 25. The cross slide 110 is provided with a longitudinally extending dove-tailed slide way 113 for guiding a longitudinally traversable carriage 114. The carriage 114 is provided with a dove-tailed slide way 115 on which a plurality of truing tool units 116, 117, 118, and 119 may be clamped in spaced adjusted positions thereon. Each of the truing tool units 116, 117, 118 and 119 are provided with a clamping block 120 (Fig. 3) to facilitate clamping the units in adjusted position on a dove-tailed slide way 115.

A suitable feeding mechanism is provided for adjusting the cross slide 110 toward and from the grinding wheel spindle 28. This mechanism comprises a rotatable feed screw 125 which meshes with or engages a rotatable nut 126 journalled in a pair of spaced anti-friction bearings 127 and 128 (Fig. 2). A shaft 129 is slidably keyed within the feed screw 125. The left hand end of the shaft 129 is rotatably supported in an anti-friction bearing (not shown) which serves to hold the shaft 129 against axial movement. A right hand end of the feed screw 125 is journalled within an anti-friction bearing supported within a piston 131. The piston 131 is slidably mounted within a cylinder 132. The nut 126 is provided with a spiral gear 133 which meshes with a spiral gear 134 which is keyed onto a rotatable shaft 135. The other end of the shaft 135 is provided with a manually operable hand wheel 136 (Fig. 1). By rotation of the hand wheel 136, a rotary motion may be imparted through the mechanism above described to rotate the feed nut 126 thereby causing a transverse movement of the cross slide 110.

In order to cause a rapid positioning movement of the cross slide 110, a hydraulically operated mechanism is provided comprising a piston 131 which is slidably mounted within a cylinder 132. The cylinder 132 is fixedly mounted on the wheel slide 25. The right hand end of the feed screw 125 is formed as a piston rod 137. The feed screw 125 may be moved in an axial direction by the movement of the piston 131 within the cylinder 132 or may be rotated in a manner to be hereinafter described for imparting motion to the cross slide 110. When fluid under pressure is passed through a pipe 140 (Fig. 9) into a cylinder chamber 141, the piston 131 will be moved toward the left (Figs. 2 and 9) to impart a corresponding movement to the cross slide 110 so as to move the truing tool units 116, 117, 118, and 119 into an operative position.

In the preferred form an independent hydraulic mechanism is provided for moving the cross slide 110 rearwardly, that is, toward the right (Figs. 2 and 9) to an inoperative position. This mechanism comprises a cylinder 142 which is fixedly mounted on the cross slide 110. The cylinder 142 contains a slidably mounted piston 143 which is connected to one end of a piston rod 144. The right hand end of the piston rod 144 is fixedly mounted on a bracket 145 which is in turn fixedly mounted relative to the slide 110. When fluid under pressure is passed through a pipe 146 into a cylinder chamber 147, the piston 143 being anchored, the cylinder 142 moves toward the right to cause a rapid rearward movement of the cross slide 110 to an inoperative position.

A manually operable rotary type valve R1 is provided for controlling the admission to and exhaust of fluid from the cylinders 132 and 142. The valve R1 is provided with a manually operable control lever 149 by means of which a valve rotor 150 may be shifted to reverse the flow of fluid under pressure when desired. As illustrated in Fig. 9, fluid under pressure from the pipe 77 passes through the valve R1, through a ball check valve 151 and a throttle valve 152, through the pipe 140 into the cylinder chamber 141. At the same time fluid within the cylinder chamber 147 may exhaust through the pipe 146, through a throttle valve 153, through the valve R1 and exhausts through a pipe 154. A ball check valve 155 is provided between the valve R1 and the pipe 146 so that when the valve R1 is reversed fluid under pressure may pass through both the throttle valve 153 and the ball check valve 155, through the pipe 146 into the cylinder chamber 147. When it is desired to effect a truing operation, the lever 149 may be rocked in a counter-clockwise direction so that fluid under pressure from the pipe 77 passes through the pipe 146 into the cylinder chamber 147 to cause a forward movement of the cross slide 110.

A power operated mechanism is provided for traversing the truing tool slide 114 longitudinally in either direction. This mechanism comprises a feed screw 156 (Fig. 1) which is journalled in a bearing 157 fixedly mounted on the cross slide 110. The feed screw 156 meshes with or engages a nut 158 mounted on the left hand end of the slide 114. A rotary type fluid motor 159 is mounted on the cross slide 110. The motor 159 is provided with a motor shaft 160 having a V-groove pulley 161 mounted on the left hand end thereof. The pulley 161 is connected by a V-belt 162 to a V-groove pulley 163 mounted on the left hand end of the feed screw 156 (Fig. 1). It will be readily apparent from the foregoing disclosure that rotation of motor shaft 160 will be imparted through the driving mechanism above described to rotate the feed screw 156 and thereby impart a longitudinal traversing movement to the slide 114, as shown diagrammatically in Fig. 9, the fluid motor 159 is illustrated as being connected directly to the feed screw 156.

A solenoid actuated control valve 165 is provided for controlling the admission to and exhaust of fluid from the fluid motor 159. Valve 165 contains a slidably mounted valve member 166 having a plurality of spaced integral valve pistons forming spaced valve chambers 167, 167a, and 167b. The valve member 166 is also provided with a central passage 167c which interconnects the valve chamber 167 with the valve chamber 167b. The valve member 166 is normally held in a central or neutral position by a pair of opposed spaced compression springs. A pair of solenoids S2A and S2B are provided for shifting the valve member 166 in opposite directions so that fluid under pressure from the pipe 77 entering the valve chamber 167a passes either through a pipe 168 to one side of the motor 159 to rotate the screw 156 so as to cause a traversing movement of the slide 114 in one direction, or through a pipe 169 to the motor 159 to impart a rotary motion to the feed screw 156 so as to traverse the slide 114 in the opposite direction. This traversing movement is substantially the same as that disclosed in the prior U.S. Patent No. 2,720,063 dated October 11, 1955 to which reference may be had for details of disclosure not contained herein.

A feeding mechanism is provided for imparting a forward movement to the cross slide 110 to advance the truing tools before each traversing movement of the slide or carriage 114. The shaft 129 (Fig. 2) is provided with a worm gear 170 which meshes with a worm 171. The worm 171 is mounted on the upper end of a vertical shaft 172. The lower end of the shaft 172 is provided with a bevel gear 173 which meshes with a bevel gear 174 mounted on a rotatable shaft 175. The shaft 175 is supported by an anti-friction bearing 176 (Fig. 7) and serves as a support for a feeding and compensating unit 180. The feeding unit 180 comprises a cylinder 181 which contains a slidably mounted piston 182. The piston 182 is normally held in a downward position by a compression spring 183 (Figs. 6 and 9). When fluid under pressure is passed through a pipe 184 into a cylinder chamber 185 formed at the lower end of the cylinder 181, the piston 182 is moved upwardly until an integral stud 186 formed on the upper end of the piston 182 engages an adjustable stop screw 187. The piston 182 is provided with a spring pressed pawl 188 (Fig. 6) which is arranged to engage the teeth of a ratchet wheel 189 which is rotatably mounted on a shaft 190. A gear 191 is keyed on to the left hand end of the shaft 190 (Fig. 7) and meshes with a gear 192 which is keyed onto the shaft 175.

During the upward movement of the piston 182, the pawl 188 rides idly over the teeth of the ratchet wheel 189. When fluid under pressure is exhausted from the cylinder chamber 185, in a manner to be hereinafter described, the released compression of the spring 183 causes a downward movement of the piston 182. During the downward movement of the piston 182, the pawl 188 engaging the teeth of the ratchet wheel 189 imparts a counter-clockwise rotary motion to the ratchet wheel 189 which is transmitted through the shaft 190, the gear 191 and the gear 192 to rotate the shaft 175 and through the mechanism just described imparts a rotary motion to the feed screw 125 (Fig. 2) so as to advance the cross slide 110 by a predetermined increment before the truing tool slide 114 starts its longitudinal traversing movement.

A second feeding mechanism is provided which is substantially identical with that just described and comprises a cylinder 201 containing a slidably mounted piston 202 which is normally held in a downward position by a compression spring 203 (Figs. 6 and 9). When fluid under pressure is passed through a pipe 204 into a cylinder chamber 205 to cause an upward movement of the piston 202, a spring pressed pawl 208 mounted on the piston 202 engaging the teeth of the ratchet wheel 189 imparts a rotary motion to the ratchet wheel 189 and through a gear mechanism previously described to impart a rotary motion to the feed screw 125 so as to advance the truing tool slide 110 by a predetermined increment before the truing tool slide 114 starts a truing tool movement in the opposite direction. The upward movement of the piston 202 continues until a stud 206 formed integral with the upper end of the piston 202 engages an adjustable stop screw 207. By manipulation of the stop screws 187 and 207, the extent of infeeding movement of the slide 110 before each stroke of the truing tool slide 114 may be independently regulated.

The piston 202 is provided with a spring pressed pawl 219 (Fig. 6) which is arranged to engage the teeth of a ratchet wheel 220 so that during each reciprocation of the piston 202, a rotary motion will be imparted through the ratchet wheel 220, the shaft 216, the worm 215 and the worm gear 214 so as to impart a predetermined rotary feeding increment to the feed screw 125 when the slide or carriage 114 starts its traversing movement in the opposite direction.

This mechanism just described serves to impart a relatively fine infeeding movement to the truing tool slide 110. A clutch mechanism (Fig. 7) is provided for connecting either the ratchet wheel 189 to the shaft 190, or to connect a worm gear 214 to the shaft 190. This clutch mechanism comprises a pin or stud 211 (Fig. 7) which is fixed relative to the shaft 190 and is arranged to be moved into engagement with a notch 213 to lock the ratchet wheel 189 to the shaft 190 when a relatively coarse infeeding movement is desired, or into engagement with a notch 212 formed integral with the worm gear 214 to lock the worm gear 214 to the shaft 190 when a relatively fine infeeding movement is desired. The shaft 190 is provided with an actuating knob 210 by means of which it may be readily shifted in an axial direction so as to engage and lock either the worm gear 214 or the ratchet wheel 189 to the shaft 190.

As shown in Fig. 7, the clutch pin 211 is in engagement with the notch 212 formed integral with the worm gear 214 to facilitate providing a relatively fine infeeding movement of the cross slide 110 before each longitudinal traversing movement of the slide or carriage 114. The worm gear 214 meshes with a worm 215 which is supported by a rotatable shaft 216. The piston 182 is provided with a spring pressed pawl 217 which is arranged to engage the teeth of a ratchet wheel 218 during each reciprocation of the piston 182 so as to impart a fine rotary motion to the feed screw 125 to advance the cross slide 110 by a predetermined increment.

In order to obtain a precise minute infeeding of the cross-slide 110 at each actuation of the feed mechanism, it is desirable automatically to back-off or unwind the feed screw 125 and thereafter to wind the feed screw to facilitate picking-up the minute feeding increment and also to take up backlash in the feed mechanism parts. This is preferably accomplished by a hydraulically operated mechanism comprising a cylinder 230 (Figs. 6 and 9) which contains a slidably mounted piston 231. The cylinder 230 is pivotally connected by a stud 237 with the wheel slide 25. The piston 231 is connected to the right hand end of a piston rod 232. The other end of the piston rod 232 is fixedly connected to a block 233 which is in turn connected by a pivot stud 234 with the compensating unit 180.

When fluid under pressure is passed through a pipe 235 into a cylinder chamber 236 formed at the left hand end of the cylinder 230, the piston 231 together with the piston rod 232 are moved toward the right so as to rock the unit 180 in a counter-clockwise direction about the axis of the shaft 175 thereby imparting an unwinding movement to the feed screw 125. During this movement a compression spring 238 is compressed. When fluid is exhausted from the cylinder chamber 236, the released compression of the spring 238 moves the piston 231 and the piston rod 232 toward the left so as to rock the unit 180 in a clockwise movement thereby imparting a winding movement to the feed screw 125.

A shuttle-type control valve 240 is provided to control the passage of fluid through the pipe 235. The valve 240 is provided with a valve piston 241 and a pair of end chambers 242 and 243. The valve 240 is connected so that it operates in timed relationship with the control valves 165 and 250. The pipe 184 is connected to the valve chamber 242, and the pipe 204 is connected to the valve chamber 243. In the position as shown in Fig. 9, fluid within the cylinder chamber 236 may exhaust through the pipe 235, the valve chamber 243, the pipe 204, and exhausts through the valve chamber 253.

A shuttle-type control valve 250, which is actuated by and in timed relationship with the valve 165, is provided to control the admission to and exhaust of fluid from the compensating cylinders 181 and 201 also to the control valve 240. The valve 250 contains a slidably mounted valve member 251 which is provided with a plurality of spaced integral valve pistons forming a pair of spaced valve chambers 252 and 253. The valve 250 is also provided with end chambers 254 and 255.

The pipe 168 is provided with a throttle valve 256 and is connected with the end chamber 254. The pipe 169 is provided with a throttle valve 257 and is connected with the end chamber 255. It will be readily apparent from the foregoing disclosure that each time the valve 165 is actuated to start longitudinal traversing movement of the slide 114, in either direction, the valve 250 together with the valve 240 are shifted automatically to actuate the compensating feed unit 180 so as to impart a transverse feeding movement to the cross-slide 110, and also to the shift valve 240 automatically to impart an unwind and wind movement to the feed screw 125 before the truing tools move into engagement with the grinding wheels.

It is desirable to impart a simultaneous compensating adjustment to the wheel feeding mechanism each time a truing feed is imparted to the cross-slide 110. This mechanism may be built-in to the feed wheel 50 in a manner substantially the same as that disclosed in the pending application Serial No. 629,532 filed December 20, 1956 by C. C. Alvord entitled Grinding Machine-Wheel Wear Compensating Mechanism which issued as U.S. Patent No. 2,894,360 on July 14, 1959. As illustrated a feed compensating unit 284 is mounted on the gear 54. This compensating mechanism serves to operatively connect the gear 54 with a shaft 260 which is connected to rotate the feed screw 40. A worm gear 276 is formed integral with the sleeve 55 (Fig. 8). The sleeve 55 is keyed to the right hand end of the shaft 260. The outer peripheral surface of the sleeve 55 serves rotatably to support the gear 54. The worm gear 276 meshes with a worm 275 which is fixedly mounted on a rotatable shaft 274. A gear 273, mounted on the shaft 274, meshes with a gear 272 which is mounted on a shaft 271. A gear 270, mounted on the shaft 271, meshes with a rack 269 formed on the periphery of a piston 264. The piston 264 is slidably mounted within a cylinder 263 which is formed in the right hand end of the shaft 260 (Fig. 8).

When fluid under pressure is passed through a pipe 277, through a plurality of radial holes 279 through a central passage 280 in the shaft 260, into a cylinder chamber 281, the piston 264 is moved toward the right (Fig. 8) against the compression of a spring 266. A slidably mounted plunger 267 is slidably supported within the right hand end of the piston 264. The compression of the spring 266 serves to urge the plunger 267 in a direction toward the right and serves to maintain it in engagement with an adjustable stop screw 268. During the compensating feed, as above described, the gear 54 is held stationary by the feed piston 96 and the gears 100 and 98. As shown diagrammatically in Fig. 9, the pipe 277 is shown as connected directly to the cylinder chamber 281.

It will be readily apparent from the foregoing disclosure that when fluid under pressure is passed through the pipe 235 or exhausted therethrough to impart an unwind and wind movement to the unit 180 and the feed screw 125, fluid is also passed through the pipe 277 so as to impart a compensating feed to the feed screw 40 and the wheel slide 25. An independent unwinding and winding movement of the grinding wheel feeding mechanism is not necessary, since this is automatically provided by rotation of the feed screw 40 during the feeding movement to and from an operative position.

As above explained, the truing tool units 116, 117, 118 and 119 are each formed with dovetailed slide surfaces which mate with dovetailed surfaces formed on the upper surface of the longitudinally movable slide 114. This arrangement facilitates setting up the machine and provides means for positioning the truing tool units along the slide 114 to correspond with the spacing of the grinding wheels 31, 32, 33 and 34, respectively. Each of the truing tool units 116, 117, 118 and 119 are identical in construction, consequently only the truing tool unit 116 has been illustrated and will be described in detail. The truing tool unit 116 (Fig. 3) is provided with a frame 289 which serves as a support for a truing tool slide 290. The truing tool slide 290 is supported by a pair of spaced rows of balls 291 and 292 which ride within V-shaped grooves 293 and 294 formed on the frame 289. The truing tool slide is provided with correspondingly spaced V-grooves 293a and 294a which serves as a support for the truing tool slide. The frame 289 is provided with an adjustable gib 295, having a V-groove 296 which engages a pair of spaced rows of balls 297 and 298. The balls 297 and 298 roll within a V-shaped groove 299 formed on the upper surface of the truing tool slide 290. Suitable adjusting screws are provided to facilitate adjusting the gib 295 relative to the frame 289 to take up lost motion in the slide parts.

The slide 290 is provided with a central aperture 300 which contains a truing tool supporting rod or member 301. A bracket 302 is mounted on the left hand end of the rod 301. The bracket 302 serves as a support for a truing tool 303 which is positioned in the desired relationship relative to the grinding wheel 31.

A nut and screw adjusting mechanism is provided for adjusting the feeding of the truing tool rod 301 relative to the slide 290 (Fig. 3). This mechanism comprises a rotatable feed screw 305 which is rotatably supported by an end cap 306 fastened to the right hand end of the slide 290. The feed screw 305 meshes with or engages a nut 307 formed integral with the truing tool support rod 301, and a compression spring 308 surrounds a portion of a rod 301 adjacent to the left hand end thereof and is interposed between a bushing 309, which is fixed relative to the slide 290, and thrust collar 310 surrounding a portion of the rod 301. The compression spring 308 serves to take-up backlash between the feed screw 305 and the feed nut 307.

A manually operable knob 311 is slidably keyed to the right hand end of the feed screw 305. If it is desired to manually adjust the position of the truing tool 303 in setting up the mechanism, the knob 311 is moved toward the right to disengage a clutch 312, after which a manual rotation of the knob 311 will impart a rotary motion to the feed screw 305 to produce a longitudinal adjustment to the rod 301 and the truing tool 303 relative to the slide 290.

A forming bar 315 (Fig. 3) is mounted on the upper surface of the cross-slide 114. Each of the truing tool units 116, 117, 118 and 119 is provided with followers 316. Each of the truing tool units 116, 117, 118, and 119, is provided with a compression spring 317, only one of which has been illustrated in Fig. 3, to facilitate maintaining the followers 316 in operative engagement with the forming bar 315 during a longitudinal traversing movement of the slide 114. As illustrated, the forming bar 315 is a straight bar having a plane operative surface to facilitate truing cylindrical surfaces on the peripheries of the grinding wheels 31, 32, 33, and 34. If it is desired to true shaped or irregular surfaces on the grinding wheels, a forming bar of the desired shape may be employed.

A plurality of feed compensating units 320, 321, 322 and 323 are provided on the truing tool units 116, 117, 118 and 119 respectively, for imparting an independent compensating adjustment to each of the truing tool feed screws 305 and also simultaneously to impart an unwind and a wind motion to the feed screws. These compensating units 320, 321, 322 and 323 are identical in construction, consequently, only one of the units 320 has been illustrated in detail in Figs. 3, 4 and 5.

The truing tool compensating unit 320 comprises a cylinder 325 (Fig. 4) which contains a slidably mounted piston 326. The piston 326 is provided with a spring pressed pawl 327 which is arranged to engage the teeth of a ratchet wheel 328 mounted on a vertical shaft 329. A compression spring 330 is provided normally to hold the piston 326 in a left hand end position (Fig. 4). When fluid under pressure is passed through a pipe 331 into a cylinder 332, the piston 326 is moved toward the right against the compression of the spring 330. During this movement, the pawl 327 engaging the teeth of the ratchet wheel 328 imparts a clockwise rotary motion to the ratchet wheel 328. The extent of movement of the piston 326 toward the right is limited by an adjustable stop screw 333.

An actuating knob 339 is mounted on the upper end of the shaft 329 to facilitate manual actuation of the truing tool compensator 320 (Figs. 1, 3 and 5). Similar actuating knobs 339a, 339b and 339c (Fig. 1) are provided for actuating the truing tool compensators 321, 322 and 323, respectively.

The ratchet wheel 328 is keyed onto the vertical shaft 329. A serrated wheel 335 is formed integral with the ratchet wheel 328 and is engaged by a spring pressed detent 336 so as to hold the ratchet wheel 328 and a shaft 329 against a counterclockwise movement (Fig. 4) during the idle stroke of the piston 326 toward the left. A worm 337 is fixedly mounted on the lower end of the shaft 329. The worm 337 meshes with a worm gear 338 which is rotatably mounted on the right hand end of the feed screw 305 (Fig. 3). The worm gear 338 is normally held fixed to the feed screw 305 by means of the clutch 312, by means of which the compensating unit 320 may be rendered inoperative when desired to facilitate a manual adjustment of the feed screw 305 in setting-up the machine.

It is desirable to impart an unwind and a wind movement to the feed screw 305 simultaneously with each actuation of the truing tool feed compensator 320 to facilitate taking up backlash in the feed mechanism parts so as to facilitate a precise minute feeding adjustment of the truing tool 303 relative to the side 290. The compensating unit 320 is provided with a cylinder 340 (Fig. 5) which contains a slidably mounted piston 341. The piston 341 is fixedly mounted on the shaft 329. A compression spring 342 surrounds the shaft 329 and is interposed between a fixed surface 343 on the frame of the compensator unit 320 and a collar 344 fixedly mounted on the shaft 329. The spring 342 serves normally to hold the shaft 329 and the piston 341 in an uppermost position.

When fluid under pressure is passed through a pipe or passage 345 into a cylinder chamber 346, the piston 341 together with the shaft 329 and the worm 337 moving in an axial direction imparts a counter-clockwise rotary motion to the worm gear 338 so as to impart an unwind motion to the feed screw 305. When fluid in the cylinder chamber 346 is free to exhaust, the released compression of the spring 342 serves to cause an upward movement of the shaft 329 and the piston 341 so as to impart a wind movement to the feed screw 305. The above described unwind and wind movement of the feed screw 305 is a rapid movement which takes place simultaneously with the actuation of the truing tool feed compensation.

Each of the truing tool compensator units 321, 322 and 323 is identical to unit 320 just described, consequently, they will not be described in detail. The actuating mechanism for feed compensation and the unwind and wind mechanism of units 321, 322, and 323 have been illustrated diagrammatically in Fig. 9 in which corresponding parts have been designated by the same reference numerals suffixed with the letters "a," "b," and "c." A solenoid actuated control valve 350 (Fig. 9) is normally held in a central position and is actuated either toward the right or toward the left by a pair of solenoids S3 and S4. When solenoid S3 is energized, the valve 350 is shifted toward the right to pass fluid under pressure through the pipes 331a, 345a to the compensating cylinder 326a and the unwind and wind cylinder 340a, respectively, of the unit 321 simultaneously to impart a compensating feed to the truing tool 303a (Figs. 1 and 9) and an unwind and wind motion to the feed screw.

Similarly when the solenoid S4 is energized, the valve 350 is shifted to the left to pass fluid under pressure through the pipes 331b and 345b of the unit 322 simultaneously to impart a compensating feed to the truing tool 303b (Fig. 1) and an unwind and wind motion to the feed screw (not shown) of the unit 322.

A solenoid valve 351 (Fig. 9) is normally held in a central position and is actuated either toward the right or toward the left by a pair of solenoids S5 and S6. When the solenoid S5 is energized, the valve 351 is shifted toward the right to pass fluid under pressure through the pipe 331 to the compensating cylinder 325 and through a pipe 345 to the unwind-wind cylinder 340 of the unit 320 simultaneously to impart a compensating feed to the truing tool 303 (Fig. 1) and an unwind-wind motion to the feed screw 305 (Fig. 3) of the unit 320. Similarly when the solenoid S6 is energized the valve 351 is shifted toward the left so as to pass fluid through a pipe 331c to the compensating cylinder 325c, and through the pipe 345c to the unwind-wind cylinder 340c of the unit 323 simultaneously to impart a compensating feed to the truing tool 303c (Fig. 1) and an unwind-wind motion to the feed screw (not shown) of the unit 323.

In order to attain one of the main objects of the invention, an automatic feed back control is provided including a memory control apparatus which is operatively connected between the post-process gauges and the wheel feed mechanism, the compensating feed mechanism for the truing tools, and the wheel truing apparatus which serves (1) to terminate the grinding cycle, (2) to impart a compensating feed to a truing tool or tools, (3) to initiate a truing cycle, (4) to reset the memory control apparatus depending upon whether a portion or portions of the work piece being post-gauged is (a) outside the tolerance limits (either oversize or undersize), (b) to impart a compensating feed to a truing tool or tools if one or more of the ground work portions are oversize or undersize but within predetermined limits, (c) to initiate a truing cycle when a predetermined number of work pieces have been ground oversize or undersize but within tolerance limits, and (d) to reset the memory control apparatus when all portions of the work piece are ground to a predetermined size.

The memory control apparatus may be mechanical, hydraulic, or electrical. As illustrated, however, an electrically operated memory control apparatus is provided including a plurality of switches SWG2, SWG3, SWG4, SWG5, a plurality of relay switches CR10, CR1, CR12, CR2, CR20, CR13, CR3, CR14, CR21, CR22, CR7, CR8, and TD1, and a stepping switch 362.

An in-process gauge is provided which contacts only one portion of the work piece being ground and serves to terminate the grinding cycle when a finished size has been reached by causing a grinding wheel and its supporting slide to move to a rearward and inoperative position. The post-process gauge, to be hereinafter described serves to gauge a work piece after it has been ground and while it is statically resting on a post gauging station which is arranged to gauge all portions of the work piece that have been ground. The post-process gauge serves to adjust the truing tools and its function is five fold, as follows:

1. To initiate a dressing cycle when any diameter is off-size within the established gauge tolerance range.
2. To feed back adjustment to the proper diamond or diamonds to compensate for diamond wear or maladjustment of diamonds.
3. To stall machine cycle when gauging a diameter or diameters that are outside of the acceptable tolerances, so as to prevent excessive scraping of the work piece.
4. To stall machine cycle after selected number of successive dressing cycles on successive work pieces including one dress cycle and a number of combination feed back and dress cycles.
5. To initiate automatic adjustment of the calibration of the in-process gauge to compensate for wear on the in-process gauge stylus and to maintain matched calibration of the process and post process gauges.

The operation of this improved sizing control is broadly defined as follows:

A work piece 21 is loaded into the machine, the wheel slide 25 moves forward and the grinding wheels 31, 32, 33, and 34 start to grind portions 21a, 21b, 21c, and 21d of the work piece 21 and a single in-process gauge G1 is swung into operative engagement with the portion 21a of the work piece 21. This gauge may be located to gauge any one of the portions being ground if desired. When the work has been ground to a predetermined size, the gauge G1 serves to terminate the grinding cycle by causing a rearward movement of the wheel slide 25.

The work piece that has been ground is then transferred to a post-gauging station 360 (Fig. 1) where it is held in a static position while a plurality of post-gauges G2, G3, G4, and G5 serves to check the portions 21a, 21b, 21c, and 21d of the work piece 21. The actual post-process gauging is done during the normal cycle of the machine while the machine is grinding the next work piece, thereby avoiding any lengthening of the cycle if sizes are all within predetermined tolerances.

While the post gauging is being performed, a second work piece has been loaded into the machine and is being ground to a size determined by the in-process gauge G1.

The in-process gauge G1 is an electric-gauge, such as is old and well known in the art, for example, that shown in the U.S. Patent No. 2,666,993 to F. G. Foster dated January 26, 1954 to which reference may be had for details of disclosure not contained herein. The post-process gauges G2, G3, G4, and G5 are preferably air operated gauges such as for example shown in the U.S. Patent No. 2,448,653 to W. F. Aller dated September 7, 1948, to which reference may be had for details of disclosure not contained herein. The post-process gauges G2, G3, G4, and G5 differ from that shown in the above mentioned patent in that a plurality of contacts are provided, whereas, in the patent only two sets of contacts are shown.

An electric stepping switch 362 is provided for controlling the starting of a truing cycle. This switch 362 consists of a rotary shaft for simultaneously actuating a plurality of switches "A," "B," "C," "D," and "E" (Fig. 9). The shaft of the switch 362 is provided with a ratchet wheel 366. A holding pawl 363 actuated by a solenoid CR7 is provided normally to hold the ratchet wheel 366 against clockwise motion. A spring 365 is provided which tends to turn the ratchet wheel 366 in a clockwise direction. An actuating pawl 364 actuated by a solenoid CR8 is provided to impart a counter-clockwise rotary indexing motion to the ratchet wheel 366 and the switch 362 which is arranged to advance the arms of the switches "A," "B," "C," "D," and "E," one step for each energization of the solenoid CR8. The stepping switch 362 is operatively connected, in a manner to be hereinafter described, to be actuated by the post process gauges G2, G3, G4, and G5. The stepping switch 362 may be any of the well known commercial switches, such as for example a "Microflex" Step Switch (M. T. Series) manufactured by the Eagles Signal Corporation of Moline, Illinois.

The gauges G2, G3, G4, and G5 are arranged to actuate a plurality of switches SWG2, SWG3, SWG4, and SWG5, respectively, through contacts G2a, G2b, G2c, G2d, and G2e (Fig. 9). Each of these switches are identical in construction and consequently only one switch SWG2 has been illustrated diagrammatically in Fig. 10. Each gauge switch is a five point switch (see Fig. 10).

(1) G2a Oversize Reject—Outside tolerance limits
(2) G2b Oversize—Within tolerance limits
(3) G2c Correct Size
(4) G2d Undersize—Within tolerance limits
(5) G2e Undersize Reject—Outside tolerance limits The switches SWG2, SWG3, SWG4, and SWG5 are identical in construction, consequently are shown diagrammatically in Fig. 9.

When a work piece 21 has been loaded into the machine, the in-process gauge G1 is swung into operative engagement with a portion 21a of the work piece 21 and a grinding cycle may then be started by rocking a cycle control lever 361 in a counterclockwise direction so as to close the cycle start switch PB3 thereby energizing a relay switch CR16 and to set-up a holding circuit through the now closed contacts of the gauge G1 to maintain the relay switch CR16 and the solenoid S1 energized. The normally open contacts "d" of the relay switch CR16 close to start the work drive motor 17. The normally open contacts "c" of the relay switch CR16 close to energize the solenoid S1 to start a forward movement of the wheel slide 25 simultaneously to grind spaced portions on the work piece 21.

When the work piece reaches a predetermined size, a pair of normally open, now closed contacts of the gauge G1 open to break the holding circuit so as to deenergize the relay switch CR16 thereby deenergizing the solenoid S1 so as to cause a rearward movement of the wheel slide 25 and also to stop the work drive motor 17. The in-process gauge G1 is then swung to an inoperative position out of engagement with the ground work piece. The ground work piece is then removed from the work centers 18—20 and a new work piece 21 to be ground is inserted there instead, and the grinding cycle is then repeated as above described after which the ground work piece is placed in the post-process gauge station 360. Placing a ground work piece in the post-process gauge station 360 closes a limit switch LS1 which completes a circuit to energize the count coil of the counter T2, and to supply power to a plurality of gauge heads G2, G3, G4, and G5 of the post-process gauge 360. When power is supplied to the post-process gauge 360 by the closing of the limit switch LS1, a circuit is completed to energize the solenoid CR8 which serves to move the pawl 364 toward the left (Fig. 9) to impart a counter-clockwise rotary motion to the switches A, B, C, D, and E, one step to the first position. A time delay relay TD1 is also energized which serves after a predetermined time interval to deenergize the solenoid CR8 so as to withdraw the pawl 364 toward the right into a reset position, as shown in Fig. 9. The post-process gauges G2, G3, G4, and G5 are arranged so that if all of the spaced portions 21a, 21b, 21c, and 21d of the work piece 21 are of correct size, a plurality of switches SWG2, SWG3, SWG4, and SWG5 are in a center position as illustrated in Fig. 9. When all of the center contacts G2c (Fig. 10) of the switches SWG2, SWG3, SWG4, and SWG5 close a circuit is made to energize the relay switches CR20, CR21, and CR22 and also serves to illuminate a signal light 380 and also serves to energize a solenoid CR7. The energizing of solenoid CR7 serves to rock the holding pawl 363 in a clockwise direction out of engagement with a ratchet wheel 366 thereby releasing the spring 365 which serves to rotate the switches A, B, C, D, and E of the stepping switch 362 in a clockwise direction so as to reset the stepping switch 362 to its original position (Fig. 9).

If, however, the stepping switch does not reset, due to the work piece being of incorrect size, an impulse is imparted through the switch "A" of the stepping switch 362 to energize a relay switch CR25 closing contacts "a," and "b." A holding circuit is set up through the normally closed contacts of the relay switches CR5 and CR6 to maintain the relay switch CR25 energized and to maintain the clutch coil of the counter T2 energized while the contacts "a" of the relay switch CR16 are opened during the grinding of a new work piece. As soon as the piece in the machine is ground to size, as governed by the in-process gauge G1, the circuit holding CR16 energized is broken to deenergize relay switch CR16 thereby closing contacts "a."

A truing cycle starts in either direction only when a circuit is closed through the relay switch CR16 and after the wheel slide 25 starts movement to a rearward or inoperative position. Then, through the then closed contacts of the relay switches CR25 and contacts "b" of relay switch CR15 the normally closed contacts of the limit switch LS7 serves to energize the relay switch CR6. Energizing the relay switch CR6 breaks a holding circuit to deenergize relay switch CR25 and the clutch coil of the counter T2 so as to reset the counter T2. The relay switch CR6 energizes the solenoid S2b thereby shifting the valve member 166 toward the left so as to start movement of the truing tool slide 114 toward the right. The shifting of valve member 166 toward the left serves to pass fluid under pressure through the pipe 168 so as to shift the valve member 251 toward the right. During this shifting movement of the valve member 251, a compensating adjustment is made to the slides 25 and 110 and an unwind and a wind movement is imparted to the feed mechanism.

The truing tool slide 114 continues toward the right until the normally closed contacts of the limit switch LS7 open thereby deenergizing the relay CR6 and the solenoid S2b which stops the fluid motor 159, thereby stopping the traversing movement of the slide 114 to the right. This completes a normal truing cycle. As the truing tool slide 114 moves toward the right away from the limit switch LS6, the normally open contacts thereof open and the normally closed contacts close so as to energize the relay switch CR9. While the truing operation is being performed, the ground work piece 21 may be removed from the work centers 18 and 20 and a new work piece to be ground inserted thereinstead. The in-process gauge G1 is then applied to the portion 21a and the next grinding cycle is started by actuating the cycle control lever 361 to close the start switch PB3. The truing operation normally is completed before the grinding starts on the next work piece. The finish ground work piece is then inserted in the post-process gauge 360. The limit switch LS1 closes so as to energize the solenoid CR8 and also to energize the time delay relay TD1 which serves to advance the stepping switch 362 so that switches A, B, C, D, and E are moved one step in a counter-clockwise direction (Fig. 9) into a second position, unless the stepping switch 362 has been previously reset. At this time nothing usually happens because the work piece was ground before the truing operation took place and should be the same size as the first work piece.

However, if the second work piece is oversize or undersize, that is outside the normal tolerance limit, the reject contacts G2a or G2e are made and the signal light 381 is illuminated. The closing of either of these contacts of the switches SWG2, SWG3, SWG4 or SWG5 serves to energize the relay switch CR17 so that solenoid S1 is deenergized to cause a rearward movement of the wheel slide 25 before the finish grinding on the work piece being ground is completed. This serves to prevent continuing undersize or oversize work pieces which would otherwise require scrapping. A reject usually indicates that there is something radically wrong and that a manual adjustment of the machine is usually required.

After the work piece is finish ground and another work piece 21 to be ground is placed in the machine, the ground work piece is then placed in the post-process gauge 360 closing the limit switch LS1 which serves to energize the count coil of the counter T2 and also to advance the stepping switch 362 to a third position. If at this time the work piece is ground to size, it will reset the stepping switch. However, if the ground work piece is not within the required limits, it serves to stop the grinding machine cycle as previously described.

When the stepping switch 362 is in either the third or fifth position, and any one of the undersize relay switches CR1, CR2, CR3, or CR4, are energized this serves to indicate that the grinding wheels or wheel opposite the undersize portion or portions are larger in diameter. The energizing of any one of the relay switches CR1, CR2, CR3, or CR4 serves to energize a corresponding solenoid valve S3, S4, S5, or S6 thereby advancing the corresponding diamond or truing tool or tools 303, 303a, 303b, or 303c opposite to the oversize grinding wheel or wheels, and also serves to start a truing cycle by first energizing relay switch CR25 and then when, relay switch CR16 is deenergized to energize relay switch CR6 and solenoid S2b. At the end of a truing cycle the relay switch CR6 and the solenoid S2b are deenergized. When relay switch CR6 is deenergized at the end of the truing cycle, the normally closed contacts of CR6 close, as shown in Fig. 9, so as to energize the clutch coil of the counter T2 to again render the counter T2 operative and also to make ready a holding circuit to hold the relay switch CR25 when it is again energized.

If any one or all portions of the work pieces are oversize, and any one of the relay switches CR10, CR12, CR13 or CR14 are energized (meaning that the corresponding grinding wheel or wheels are smaller in diameter), this serves to energize the corresponding solenoids S3, S4, S5, or S6 so as to advance the truing tool opposite the larger diameter grinding wheel or wheels so as to reduce the diameter thereof during the next truing cycle. At the time the truing tool slide starts a longitudinal movement in either direction to initiate a truing cycle a compensating feed is imparted to the truing tool feed mechanism, and simultaneously therewith an unwind and a wind motion is imparted at the start of each truing cycle.

When the truing tool slide 114 is in a right hand end position and either the counter T2 counts-out, or the post-process gauge 360 calls for a wheel truing cycle, the truing tool slide 114 is traversed toward the left (Fig. 9) for a truing cycle. When the counter T2 counts-out, at the time a ground work piece is removed from the post-process gauge, the limit switch LS1 is opened so as to close the contacts "a" of the counter T2 thereby energizing the relay switch CR25 to start a truing cycle in the reverse direction, that is, toward the left.

When the stepping switch is in either the first, third or fifth position and the ground work piece in the post-process gauge 360 is oversize or undersize, that is, when any of the switches SWG2, SWG3, SWG4, or SWG5 are in either position G2b or G2d (Fig. 10), a truing cycle will be initiated by energizing the relay switch CR25. When the stepping switch 362 is in the first position, the switch "A" serves to initiate a truing cycle only. When the stepping switch 362 is in either a third or fifth position, the switches "A," "B," "C," "D," and "E," the switch "A" serves to make ready a circuit for a truing cycle and at the same time switches "B," "C," "D," or "E" make ready a circuit to initiate a truing tool adjustment when initiated by the post-process gauge 360.

When relay switch CR25 is energized either by the counter T2 or by the actuation of the post-process gauge 360 and the stepping switch 362 (truing tool slide 114 in a right hand end position) serves to energize relay switch CR25 and thereby close the normally open contacts "a," and "b." A holding circuit is set up through the normally closed contacts of the relay switches CR5 and CR6 to hold the relay CR25 energized so that when the work piece being ground reaches size, a circuit is broken to deenergize relay CR16 which closes contacts "a" (CR16), then through the now closed contacts "a" (CR25), and through the now closed contacts of relay switch CR9 which are energized by normally closed contacts of the limit switch LS6, since slide 114 is at a right hand end position, and the now closed (normally open) contact of the limit switch LS7 serves to energize the relay switch CR5. Energizing of relay switch CR5 breaks the holding circuit to deenergize relay switch CR25 and also to reset the counter T2. Energizing of relay switch CR5 closed the normally open contacts thereof to energize the solenoid S2a. A holding circuit is set up through the normally closed contacts of the limit switch LS6 to maintain the relay switch CR5 and the solenoid S2a energized so as to shift the valve member 166 toward the right. The shifting of the valve member 166 toward the right serves to start the fluid motor 159 to move the truing tool slide 114 toward the left.

The shifting of the valve member 166 toward the right serves also to pass fluid under pressure through the pipe 169 to shift the valve member 251 toward the left into the position shown in Fig. 9. During this movement of the valve member 251, a compensating adjustment is made to the slides 25 and 110, and an unwind and a wind movement is imparted to the feed mechanism. Movement of the slide 114 toward the left continues until the limit switch LS6 is actuated. The normally closed contacts of the limit switch LS6 opens to deenergize the relay switch CR9 and the relay switch CR5 and the solenoid S2a thereby stopping the fluid motor 159 with the slide 114 in a left hand end position.

If the stepping switch 362 ever reaches the seventh position, without resetting, there is something out of adjustment and a manual adjustment is probably required. If any of the relay switches, CR10, CR1, CR12, CR2, CR13, CR3, CR14, or CR4 are energized (which would most unlikely happen) and if the work piece is not a reject, the relay switch CR17 is energized and the wheel slide 25 moves immediately to a rearward or inoperative position and shuts down the machine until repairs or adjustments may be made.

The stepping switch 362 may be manually reset, when desired, by actuation of the push button switch PB9. The manual adjustment of the diamonds or truing tools may be accomplished manually by actuation of the push button switches PB5, PB6, PB7 or PB8. The gauge G1 serves to control the grinding cycle by gauging one diameter only of the work piece.

If a continuous truing operation is desired, the switch SW3 is closed and the switch SW2 opened after which the push button switch PB4 may be actuated to start a continuous truing cycle. A continuous truing cycle is particularly useful when worn out grinding wheels are replaced with new grinding wheels or when the machine is being set up, or grinding wheels are being mounted.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

We claim:

1. A grinding machine having a base, a rotatable work support thereon for supporting a work piece having a plurality of spaced portions to be ground, a transversely movable wheel slide, a plurality of spaced rotatable grinding wheels thereon which are spaced simultaneously to grind spaced portions on the work piece, a feeding mechanism to feed said slide transversely in either direction, means including an in-process work gauge operatively connected to control said feeding mechanism so as to terminate the grinding cycle when a portion of the work piece has been ground to a predetermined size, means including a post-process gauge including a plurality of spaced independent gauging means for gauging each portion of the ground work piece, and operative connections between said post-process gauges and said feeding means to terminate a grinding cycle when any portion or portions of the ground work piece are ground oversize or undersize.

2. A grinding machine having a base, a rotatable work support thereon, a transversely movable wheel slide, a plurality of spaced rotatable grinding wheels thereon, feeding means to feed said slide transversely in either direction, means including and in-process work gauge operatively connected to control said feeding means so as to terminate a grinding cycle when a portion of the work piece has been ground to a predetermined size, a grinding wheel truing apparatus including a plurality of spaced truing tools simultaneously to true all of said grinding wheels, means simultaneously to traverse said truing tools longitudinally, means simultaneously to impart a compensate feed to said wheel slide and to said truing tools, an independent compensating feed mechanism for each of the truing tools, means including a post-process gauge including a plurality of spaced independent gauging means for gauging each ground portion of the ground work piece, and operative connections between said post-process gauges and said compensating feed mechanism independently to impart a compensating adjustment to said truing tools.

3. A grinding machine having a base, a rotatable work support thereon, a transversely movable wheel slide, a plurality of spaced rotatable grinding wheels thereon, a feeding means to feed said slide transversely in either direction, means including an in-process work gauge operatively connected to control said feeding means so as to terminate a grinding cycle when a work piece has been ground to a predetermined size, a grinding wheel truing apparatus including a plurality of spaced truing tools simultaneously to true all of said grinding wheels, an independent compensating feed mechanism for each of said truing tools, means including a post-process gauge including a plurality of spaced independent gauging means for gauging each ground portion of the ground work piece, and operative connections between said post-process gauges and said compensating feed mechanism independently to impart a compensating adjustment to said truing tools.

4. A grinding machine, as claimed in claim 3, in combination with the parts and features therein specified of a memory control apparatus, operative connections between said control apparatus and said post-process gauges, and operative connections between said control apparatus and said wheel feeding means to terminate a grinding cycle when any portion or portions of the ground work piece are ground oversize or undersize.

5. A grinding machine, as claimed in claim 3, in combination with the parts and features therein specified of a memory control apparatus, operative connections between said apparatus and said post-process gauges, operative connections between said apparatus and said grinding wheel feeding means, operative connections between said apparatus and said truing tool compensating feed mechanism, and operative connections between said apparatus and said grinding wheel truing apparatus.

6. A grinding machine, as claimed in claim 3, in combination with the parts and features therein specified of a memory control apparatus, and operative connections between said control apparatus and said post-process gauges to reset said control apparatus when all portions of the ground work piece are ground to a predetermined size.

7. A grinding machine, as claimed in claim 3, of a memory control apparatus, operative connections between said memory control apparatus and said post-process gauges to actuate said control apparatus when one or all of the ground portions of the work piece are off-size but within tolerance limits, said control apparatus serving after a predetermined number of work pieces are ground off-size to advance one or more of the truing tools and to initiate a truing cycle.

8. A grinding machine as claimed in claim 3, of an electric stepping switch and operative connections between said stepping switch and said post-process gauge to advance said switch one step when a work piece is ground to an off-size but within tolerance limits, said switch being arranged so that after a predetermined number of work pieces are ground off-size but with tolerance limits to impart a compensating feed to one or more of the truing tools, and to initiate a wheel truing cycle.

9. A grinding machine, as claimed in claim 3, in combination with the parts and features therein specified of an electric stepping switch, operative connections between the post-process gauge and the stepping switch to advance said switch unless the previously ground work piece is ground to a predetermined size or to reset the stepping switch when the work piece is ground to a predetermined size, operative connection between said stepping switch and said independent compensating feed mechanisms to impart a compensate adjustment to one or more of the truing tools so as to reposition said truing tools for the next truing cycle.

10. A grinding machine, as claimed in claim 3, in combination with the parts and features therein specified of an electric stepping switch, operative connections between the post-process gauge and the stepping switch to advance said stepping switch, and means actuated by said post-process gauge to terminate the grinding cycle when one or more portions of the ground work piece are outside predetermined limits.

11. A grinding machine, as claimed in claim 3, in which an independent nut and screw feeding mechanism is provided for each of said truing tools, an independent compensating mechanism for independently actuating each of said feeding mechanisms independently to advance each of said truing tools, and an independent piston and cylinder to impart an unwind and a wind motion to each of said nut and screw feeding mechanisms each time a compensating feed is imparted thereto, a post-process gauge having independent gauges for each portion of the ground work piece, operative connections between said gauges for each of said compensating mechanism and said unwind and wind mechanisms to facilitate stopping the grinding cycle on the next work piece when any portion of the ground work piece is ground over or undersize.

12. A grinding machine as claimed in claim 3 in which an electric counter is operatively connected to initiate a truing cycle after a predetermined number of work pieces have been ground, said post-process gauge being arranged to initiate a truing cycle when a work piece has been ground oversize or undersize but within tolerance limits, and means actuated by and in timed relation with the truing cycle to reset said counter when a truing cycle is initiated.

13. A grinding machine, as claimed in claim 3 in which an electric counter is operatively connected to initiate a truing cycle after a predetermined number of successive work pieces have been ground to a predetermined size, an electric stepping switch, operative connections between said stepping switch and said post-process gauge to initiate a wheel truing cycle after a predetermined number of work pieces are ground off-size but within tolerance limits, means to reset said stepping switch when a work piece is ground to a predetermined size, and means to reset said counter each time a wheel truing cycle is initiated by said stepping switch and also each time a wheel truing cycle is initiated by the counter.

14. A grinding machine, as claimed in claim 3, in which an electric counter is operatively connected to initiate a truing cycle after a predetermined number of successive work pieces have been ground to a predetermined size, an electric stepping switch, operative connections between said stepping switch and said post-process gauge to initiate a wheel truing cycle after a predetermined number of work pieces are ground off-size but within tolerance limits, said stepping switch being arranged to actuate said compensating feed mechanisms to impart a compensating adjustment to said truing tools, means to reset said stepping switch when a work piece is ground to a predetermined size, and means to reset said counter each time a wheel truing cycle is initiated by said stepping switch and also each time a wheel truing cycle is initiated by the counter.

References Cited in the file of this patent
UNITED STATES PATENTS

| | | |
|---|---|---|
| 2,042,257 | Harrison et al. | May 26, 1936 |
| 2,720,063 | Hill | Oct. 11, 1955 |